United States Patent [19]

Feldman

[11] Patent Number: 5,217,171
[45] Date of Patent: Jun. 8, 1993

[54] METHOD FOR PROCESSING SCRAP OF ELECTRONIC INSTRUMENTS

[75] Inventor: Alexander V. Feldman, McLean, Va.

[73] Assignee: F&T Technology Corporation, McLean, Va.

[21] Appl. No.: 803,052

[22] Filed: Dec. 6, 1991

[51] Int. Cl.$^5$ ................................................. B02C 7/00
[52] U.S. Cl. ................................. 241/24; 241/DIG. 38
[58] Field of Search ..................... 241/20, 24, 29, 76, 241/DIG. 38

[56] References Cited

U.S. PATENT DOCUMENTS

| | | | |
|---|---|---|---|
| 4,242,129 | 12/1990 | Kellerwessel et al. | 241/20 X |
| 4,775,106 | 10/1988 | Jha et al. | 241/20 |
| 5,139,203 | 8/1992 | Alavi | 241/20 |

Primary Examiner—Douglas D. Watts
Attorney, Agent, or Firm—Daniel R. Gropper

[57] ABSTRACT

A method is taught for processing scrap of electromagnetic equipment containing precious, nonferrous and ferrous metals, plastics and ceramics to recover significant portions of the precious metals contained therein. The method involves mechanically crushing the scrap to produce a mechanical mixture of particles of the electromagnetic equipment. This mixture is then subjected to mechanical concentration by hydrocyclone and recleaning on a cleaning table thereby producing a rough concentrate of precious and nonferrous metals. This rough concentrate is in turn, subjected to magnetic separation and then hydrometallurgical processing whereby the nonferrous metals leach into solution thereby producing an enriched concentrate of precious and nonferrous metals in the solid sediment.

6 Claims, No Drawings

METHOD FOR PROCESSING SCRAP OF ELECTRONIC INSTRUMENTS

FIELD OF THE INVENTION

The present invention teaches a method to recover and process resources and, more specifically, a method for processing the scrap of electromagnetic equipment containing precious, nonferrous and ferrous metals as well as plastics and ceramics with a view toward separating the scrap to produce enriched concentrates of precious and nonferrous metals which, in turn, are economically profitable in production of pure precious and nonferrous metals by many different means.

DESCRIPTION OF RELATED ART

A method for processing waste containing metals and nonmetals with the purpose of extracting useful materials therefrom is taught by (NL,A,181177).

This method involves crushing source material and subjecting it to mechanical concentration including dry magnetic separation to segregate the magnetic product containing predominantly ferrous metals from the nonmagnetic residue. The nonmagnetic residue is separated in a liquid of a certain density into heavy (metallic) and light (nonmetallic) fractions. The metallic fraction is separated into two parts and the heavier one is separated in two successively arranged hydrocyclones again into a heavy fraction (suspension with a density exceeding 2.2 g/cm$^3$) which is regarded as enriched concentrate of precious metals, and a light fraction.

This known method is sufficiently effective for processing materials whose nonmetallic component is mostly rubber or polyvinyl chloride, as is the case, for example, in processing wastage of the cable industry.

Using this method, it is virtually impossible to ensure thorough extraction of precious metals into enriched concentrate by more than 35–45% which renders further processing of such concentrate unprofitable.

A low recovery value through use of this method should be attributed to the following.

Firstly, during dry magnetic separation a high adhesion originated by electrostatic forces causes the particles of nonmetals (plastics and ceramics) to be combined into aggregates. Such aggregates also include particles of ferrous (magnetic) and of precious and nonferrous metals. This brings about losses of precious metals with the magnetic products.

Secondly, performance of hydrocyclones which separate suspensions consisting mainly of particles whose density exceeds 3000 g/cm$^3$ (metals) is extremely ineffective. In order to keep heavy metal particles in a suspended state the velocities of flows in hydrocyclones must be very high which will result in intensive carry-over of small particles of precious metals to hydrocyclone overflow, and accordingly their nonrecovery.

Dunning B.N. "Precious metals recovery from electronic scrap" Inf Circ. Bur. Mines U.S. Dep. Inter.", 1986 N 9059, p. 44–56 teaches another method for processing scrap of electromagnetic equipment containing precious, nonferrous and ferrous metals as well as plastics and ceramics.

In this method the source material is crushed to liberate the scrap elements in the form of a mechanical mixture of particles. The mixture of particles is mechanically concentrated thereby producing a rough concentrate of precious and nonferrous metals which is in turn subjected to hydrometallurgical processing. This process then transfers nonferrous metals into solution by leaching and produces an enriched concentrate of precious metals in a solid sediment.

In this process electronic scrap is initially crushed by a hammer crusher.

Mechanical concentration is then carried out by air and magnetic classification, separation on vibratory tables, eddy-current classification and sorting in a high-intensity field.

However, in dry (air) mechanical concentration, particularly in magnetic and eddy-current classification stages, the plastic and ceramic particles are combined under the effect of electrostatic forces into spherical hollow aggregates which capture metal particles. Separation of such aggregates into metallic and nonmetallic fractions by air classification is impossible. This reduces the recovery of precious metals into the end product.

Additionally, the particles crushed by the hammer crusher may have different configurations making sorting more difficult. For example, a certain percentage of metal particles will likely have the shape of plates which are noted for a large sail area and are carried during air classification into final tailings, and hence not recovered. At the same time the coarse particles of plastics pass into concentrate thus rendering the concentrate less pure it.

The total recovery of metallic fraction containing precious metals into basic concentrate using this method does not exceed 60–65% which is not cost effective.

DISCLOSURE OF THE INVENTION

The basic object of the invention is to increase the percentage of recovery of precious metals into enriched concentrate.

Another object of the invention resides in providing the possibility of reutilization of substantially all of the components of scrapped electromagnetic equipment.

Another object of the invention is the disclosure of a method for processing scrap of electromagnetic equipment containing precious, nonferrous and ferrous metals as well as plastics and ceramics involving the steps of crushing the equipment to the point of liberation of scrap elements, thereby producing a mechanical mixture of particles, mechanically concentrating the particle mixture, thereby producing a rough concentrate of precious and nonferrous metals, and then hydrometallurgically processing this rough concentrate, thereby transferring nonferrous metals through leaching into solution and producing an enriched concentrate of precious metals in the solid sediment.

Another object of this invention is to carry out mechanical concentration of the particle mixture by separating the mixture in a hydrocyclone to form a heavy fraction in the form of a concentrate containing metallic components and large plastic and ceramic particles, and a light fraction in the form of overflow product containing light plastic and ceramic particles.

Another object of this invention is to take the heavy fraction formed in the hydrocyclone process and recleaning this material on a concentrating table and thereby separating this material into bulk metallic concentrate and final tailings containing plastic and ceramic particles.

Another object of this invention is taking the bulk metallic concentrate and separating it magnetically thereby producing nonmagnetic rough metallic concentrate and a magnetic product containing ferrous metals.

Another object of this invention is to increase the recovery rate of precious and nonferrous metals found in the overflow product of the hydrocyclone by directing the light fraction containing small plastic and ceramic particles and precious and nonferrous metals into a hydrocyclone for additional extraction of metallic particles into the second concentrate which is then recleaned and produces the second bulk metallic concentrate which is then directed to magnetic separation which will produce additional nonmagnetic rough metallic concentrate.

Another object of the invention is to ensure the fullest separation of the particle mixture into heavy and light fractions, by maintaining the solid-to-liquid phase ratio within the hydrocyclone within the range of 1:3-12 and the relative diameters of underflow and overflow tubes of the hydrocyclone within the range of 1:1.5-6.

Another object of this invention is to achieve the maximum transfer of metallic components into bulk metallic concentrate by maintaining the concentrate table at a lateral inclination angle of 4°-10° and a relation of flow rates of wash water and table feeding within the range of 15-30:1.

Another object of this invention is to recover 78-80% of precious metals into enriched concentrate.

Another object of this invention is to recover precious metals suitable for use in the metallurgical industry and in civil engineering applications.

BEST MODES OF CARRYING OUT THE INVENTION

The method for processing scrap of electromagnetic equipment containing precious, nonferrous and ferrous metals as well as plastics and ceramics, according to the invention, involves mechanically breaking the scrap into large elements, then crushing it, for example, in hammer crushers, to the point of liberation of scrap elements, wherein the metallic components of scrap are completely separated from plastics and ceramics. The mechanical mixture produced by the hammer crushers consists of metallic particles (precious, nonferrous and ferrous metals), plastic and ceramic particles.

This mixture of particles is subjected to mechanical concentration producing a rough concentrate of precious and nonferrous metals from which nonferrous metals are extracted into solution by hydrometallurgical processing by leaching, producing the end product of enriched concentrate of precious metals in the form of solid sediment.

Mechanical concentration of the particle mixture is carried out by separating it in a hydrocyclone into a heavy fraction, i.e. concentrate containing metallic components and coarse plastic and ceramic particles, and a light fraction in the form of the overflow product containing light ceramic and plastic particles.

The relation of solid and liquid phases in the hydrocyclone is kept within the range of 1:3-12 and the relation of diameters of the underflow and overflow hydrocyclone tubes is kept within the range of 1:1.5-6.

The heavy fraction separated in the hydrocyclone is then recleaned on a concentrating table, and separated into bulk metallic concentrate and final tailings containing plastic and ceramic particles that have been transferred into the heavy fraction in the hydrocyclone.

Recleaning is conducted at a lateral inclination angle of the concentrating table ranging from 4°-10° and a relation of flow rates of wash water and table feeding selected within the range of 15-30:1.

The bulk metallic concentrate thus obtained, which contains precious, nonferrous, and ferrous metals, is then subjected to magnetic separation for separating the bulk metallic concentrate into the magnetic product containing ferrous metals and into the nonmagnetic rough concentrate containing precious and nonferrous metals.

For additional extraction of valuable metal components, the overflow product obtained after separation of particle mixture in the hydrocyclone is subjected to control concentration by feeding it again into the hydrocyclone and thus producing additional concentrate containing precious, nonferrous and ferrous metals, and final tailings. The additional concentrate is directed, just as it has been described above with reference to the main concentrate, to recleaning on the concentrating table. The additional bulk metallic concentrate then undergoes magnetic separation producing additional nonmagnetic rough metallic concentrate.

The main and additional rough metallic concentrates are then directed to hydrometallurgical processing which is realized by any conventional method, for example, by leaching and passing of nonferrous metals into solution and producing enriched concentrate of precious metals.

Leaching is carried out first by treating the nonmagnetic product in an alkali solution, dissolving aluminum into solution and producing a solid sediment which is then treated in a 20% solution of sulfuric acid in an autoclave at a surplus oxygen pressure in three stages. As a result, copper and other nonferrous metals are dissolved into solution, and a solid sediment is formed. The latter is the enriched concentrate of precious metals.

The use of concentration by gravity in water, i.e. processing of source crushed material in the hydrocyclone at the disclosed parameters of water flow rate permits adhesion of small nonmetallic particles to metallic particles by enveloping them with neutral hydrated shells which are not subjected to electrostatic effect. The concentration parameters in the hydrocyclone (relation of tube diameters) ensures the fullest separation of the heavy fraction with a maximum transfer of metal into it and practically full quantitative separation during this operation of small particles of plastic-ceramic fraction with a developed surface. The delivery of this fraction to the subsequent operation, i.e. recleaning on the concentrating table, would reduce efficiency of this operation due to increased viscosity of pulp and formation of aggregates of small plastic particles.

Recleaning of the main concentrate on the concentrating table at the disclosed parameters ensures the fullest separation of large plastic particles from the heavy fraction and produces bulk metallic concentrate. The magnetic separation of this bulk metallic concentrate makes it possible to produce a nonmagnetic metallic fraction containing the basic portion of metals which is suitable for subsequent hydrometallurgical autoclave processing and producing enriched concentrate of precious metals suitable for affinage. The sequence of operations according to this invention prevents spreading precious metals over the processed products and ensures recovery of not less than 75-80% of the precious metals.

When the solid-to-liquid phase ratio in the hydrocyclone drops below 1:3, this increases viscosity of pulp, and the particles are not separated in the hydrocyclone, and the recovery of precious metals diminishes and the positive effect is not attained.

If the solid to liquid phase ratio in the hydrocyclone exceeds 1:12, this reduces output in terms of solid product, and the processing cycle is prolonged, and the recovery of precious metals diminishes, and no positive effect is attained.

If the relation of the diameters of the underflow and the overflow tubes is below 1:1.5, extraction of plastic and ceramic particles into sand increases which impoverishes feeding of the concentrating table by these particles, and impairs separation in this operation, and reduces recovery of precious metals into the bulk metallic concentrate and the positive effect is not reached.

If the relation of diameters of underflow and overflow tubes exceeds 1:6, metal particles are carried over into overflow of the hydrocyclone, and extraction of precious metals into the main concentrate diminishes and the positive effect is not achieved.

If recleaning takes place on the concentrating table with a lateral inclination angle less than 4°, the bulk metallic concentrate on the table is impoverished by the plastic-ceramic fraction which hinders further hydrometallurgical processing of such concentrate by autoclaving and the positive effect is not attained.

If recleaning is conducted on the concentrating table with a lateral inclination angle exceeding 10°, the particles of metal are carried over into final tailings, and extraction of precious metals into concentrate diminishes, and the positive effect is not achieved.

If the relation of water flow rate to volume of table feeding is less than 15:1, the feed is insufficiently loosened, and the table top is fouled and the concentrate is impoverished by the plastic-ceramic fraction which renders impossible further processing of such a product in the autoclave and the positive effect is not attained.

If the relation of water flow rate and volume of table feeding exceeds 30:1, the plate-like particles of precious metals are carried over into table tailings, and extraction of noble metals into concentrate drops and the positive effect is not attained.

The method for processing scrap of electromagnetic equipment according to the invention will be understood better from a description of its concrete embodiments that follow.

EXAMPLE 1

The selected 1-kg portion of electronic scrap had the following composition, mass %:

| | |
|---|---|
| copper | 19 |
| iron | 3.6 |
| nickel | 0.8 |
| tin | 1.1 |
| lead | 1.9 |
| aluminum | 4.1 |
| zinc | 0.8 |
| gold | 0.112 |
| silver | 0.521 |
| plastics and ceramics - the balance. | |

The feed was crushed to a size of 74 um (75%) and finer than 74 um (25%) and was mechanically concentrated in the hydrocyclone at a solid-to-liquid phase ratio of 1:7. The relation of diameters of the sand and overflow tubes of 1:3.5. This produced the overflow product containing finely disintegrated plastics, and sands. The overflow is a final tail product. The sands were processed in two stages on the concentrating table with a lateral inclination angle of 7° and a relation of flow rate of wash water and table feeding equal to 22:1. The processing produced final tailings containing crushed particles of plastics and ceramics, and concentrate. The concentrate was subjected to magnetic separation which produced magnetic and nonmagnetic products. The nonmagnetic product contained:

| | |
|---|---|
| copper | 61.5% |
| iron | 0.73% |
| nickel | 0.15% |
| tin | 3.28% |
| lead | 5.57% |
| aluminum | 12.1% |
| zinc | 2.4% |
| gold | 0.37% |
| silver | 1.74% |
| plastics and ceramics the balance. | |

The recovery of precious metals into the nonmagnetic product was 82% gold and 79% silver.

The nonmagnetic product was subjected to hydrometallurgical processing by treating it in a 20% solution of sodium hydroxide, and the main part of aluminum and a part of lead passed into the solution. After separation of the solution the solid sediment was treated with a 20% solution of sulfuric acid in an autoclave at a surplus oxygen pressure in three stages for dissolving copper into the solution. The solid sediment produced by sulfuric acid leaching is the enriched concentrate of precious metals containing 9.5 mass % silver and 2.5 mass % gold.

The through recovery, taking in account the hydrometallurgical processing, was 65% silver and 77% gold.

The examples 2 through 17 were realized similarly to Example 1 with a sole difference that the ratios of solid and liquid phases and hydrocyclone tube diameters, lateral inclination angles and relations of flow rates of wash water and table feeding were changed within the intervals of parameters according to the invention and, for comparison, beyond the limits of these intervals. The variable parameters and the recovery of precious metals after mechanical concentration in Examples 1 through 17 are summarized in the Table below.

TABLE

| | Mechanical concentration | | | | | |
|---|---|---|---|---|---|---|
| | Hydrocyclone | | Concentrating table | | | |
| No | Solid-to-liquid phase ratio | Relation and of underflow overflow tube diameters | Lateral inclination angle of table top | Relation of flow rates of wash water and feed | Recovery, % | |
| | | | | | Gold | Silver |
| 1 | 1:7 | 1:3.5 | 7 | 22:1 | 82 | 79 |
| 2 | 1:3 | 1:3.75 | 7 | 22.5:1 | 81 | 79 |
| 3 | 1:2 | 1:3.75 | 7 | 22.5:1 | 80 | 78 |
| 4 | 1:7.5 | 1:1.5 | 7 | 22.5:1 | 82 | 78 |
| 5 | 1:7.5 | 1:6 | 7 | 22.5:1 | 80 | 80 |
| 6 | 1:7.5 | 1:3.75 | 4 | 22.5:1 | 82 | 80 |
| 7 | 1:7.5 | 1:3.75 | 10 | 22.5:1 | 80 | 79 |
| 8 | 1:7.5 | 1:3.75 | 7 | 15.0:1 | 81 | 78 |
| 9 | 1:7.5 | 1:3.75 | 7 | 30.0:1 | 82 | 79 |
| 10 | 1:2.0 | 1:3.75 | 7 | 22.5:1 | 72 | 69 |
| 11 | 1:13.0 | 1:3.75 | 7 | 22.5:1 | 79 | 75 |
| 12 | 1:7.5 | 1:1.25 | 7 | 22.5:1 | 79 | 77 |
| 13 | 1:7.5 | 1:7.0 | 7 | 22.5:1 | 72 | 69 |
| 14 | 1:7.5 | 1:3.75 | 3 | 22.5:1 | 79 | 77 |
| 15 | 1:7.5 | 1:3.75 | 11 | 22.5:1 | 73 | 70 |
| 16 | 1:7.5 | 1:3.75 | 7 | 14.0:1 | 79 | 77 |

TABLE-continued

| | Mechanical concentration | | | | | |
| | Hydrocyclone | | Concentrating table | | | |
| No | Solid-to-liquid phase ratio | Relation and of underflow overflow tube diameters | Lateral inclination angle of table top | Relation of flow rates of wash water and feed | Recovery, % Gold | Silver |
|---|---|---|---|---|---|---|
| 17 | 1:7.5 | 1:3.75 | 7 | 31.0:1 | 78 | 76 |

It can be seen from the above table that maintenance of the variable parameters within the limits of the intervals according to the invention ensures extraction of precious metals into rough concentrate after mechanical concentration equal to 78–80% silver and 80–82% gold.

If, however, said parameters go somewhat beyond the abovementioned intervals (examples 10 through 17), the percentage of extraction of precious metals guaranteed by the method according to the invention diminishes but still stays sufficiently high, viz., 70–77% silver and 72–79% gold.

What I claim is:

1. A method for processing the scrap of electromagnetic equipment containing precious, nonferrous and ferrous metals, plastics and ceramics comprising the steps of:
    a. mechanically crushing said electromagnetic equipment, thereby creating a mechanical mixture of particles of said electromagnetic equipment wherein the size of said particles is sufficiently small so as to permit further separation of said particles into their component parts;
    b. separating said mixture of particles by hydrocyclone into:
        (1) a heavy fraction, containing particles of metallic components and large particles of plastics and ceramics; and,
        (2) a light fraction, containing small particles of plastics and ceramics, in the form of the overflow thereof;
    c. recleaning said heavy fraction on a cleaning table thereby yielding:
        (1) a fraction of bulk metallic concentrate containing particles of metallic components; and,
        (2) a fraction of final tailings containing smaller particles of plastics and ceramics;
    d. performing magnetic separation on said bulk metallic concentrate thereby yielding:
        (1) a magnetic product containing ferrous metals; and,
        (2) a nonmagnetic rough metallic concentrate containing precious and nonferrous metals; and,
    e. performing hydrometallurgical processing on said rough metallic concentrate wherein:
        (1) said nonferrous metals pass into solution; and,
        (2) said precious metals form a solid sediment.

2. A method for processing the scrap of electromagnetic equipment containing precious, nonferrous and ferrous metals, plastics and ceramics, as recited in claim 1, further comprising the steps of:
    a. taking said light fraction, containing small particles of plastics and ceramics, in the form of the overflow thereof; and,
    b. separating said light fraction by hydrocyclone into:
        (1) a heavy fraction, containing particles of metallic components and large particles of plastics and ceramics; and,
        (2) a light fraction, containing small particles of plastics and ceramics;
    c. recleaning said heavy fraction on a cleaning table thereby yielding:
        (1) a fraction of bulk metallic concentrate containing particles of metallic components; and,
        (2) a fraction of final tailings containing smaller particles of plastics and ceramics;
    d. performing magnetic separation on said bulk metallic concentrate thereby yielding:
        (1) a magnetic product containing ferrous metals; and,
        (2) a nonmagnetic rough metallic concentrate containing precious and nonferrous metals; and,
    e. performing hydrometallurgical processing on said rough metallic concentrate wherein:
        (1) said nonferrous metals pass into solution; and,
        (2) said precious metals form a solid sediment.

3. A method for processing the scrap of electromagnetic equipment containing precious, nonferrous and ferrous metals, plastics and ceramics, as recited in claim 1, wherein the solid-to-liquid phase ratio in said hydrocyclone is maintained at 1:3–12 and wherein the diameters of the underflow to the overflow tubes of said hydrocyclone is 1:1.5–6.

4. A method for processing the scrap of electromagnetic equipment containing precious, nonferrous and ferrous metals, plastics and ceramics, as recited in claim 1, wherein said recleaning of said heavy fraction is conducted on a cleaning table with a lateral inclination of 4°–10° and a relation of flow rates of wash water and table feed within 15–30:1.

5. A method for processing the scrap of electromagnetic equipment containing precious, nonferrous and ferrous metals, plastics and ceramics, as recited in claim 2, wherein the solid-to-liquid phase ratio in said hydrocyclone is maintained at 1:3–12 and wherein the diameters of the underflow to the overflow tubes of said hydrocyclone is 1:1.5–6.

6. A method for processing the scrap of electromagnetic equipment containing precious, nonferrous and ferrous metals, plastics and ceramics, as recited in claim 2, wherein said recleaning of said heavy fraction is conducted on a cleaning table with a lateral inclination of 4°–10° and a relation of flow rates of wash water and table feed within 15–30:1.

* * * * *

UNITED STATES PATENT AND TRADEMARK OFFICE
CERTIFICATE OF CORRECTION

PATENT NO. :  5,217,171
DATED      :  June 8, 1993
INVENTOR(S):  Alexander V. Feldman It is certified that error appears in the above-indentified patent and that said Letters Patent is hereby corrected as shown below:

On the title page, item [22], change the filing date from "Dec. 6, 1991" to --Dec. 9, 1991--.

Signed and Sealed this

Ninth Day of November, 1993

Attest:

BRUCE LEHMAN

Attesting Officer

Commissioner of Patents and Trademarks